United States Patent
Moesl et al.

(10) Patent No.: US 10,408,447 B2
(45) Date of Patent: Sep. 10, 2019

(54) EVAPORATOR ARRANGEMENT

(71) Applicant: Webasto SE, Stockdorf (DE)

(72) Inventors: Klaus Moesl, Stockdorf (DE); Bengt Meier, Stockdorf (DE); Volodymyr Ilchenko, Stockdorf (DE); Michael Poehner, Stockdorf (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 15/527,423

(22) PCT Filed: Oct. 26, 2015

(86) PCT No.: PCT/DE2015/100449
§ 371 (c)(1),
(2) Date: May 17, 2017

(87) PCT Pub. No.: WO2016/078641
PCT Pub. Date: May 26, 2016

(65) Prior Publication Data
US 2017/0321891 A1 Nov. 9, 2017

(30) Foreign Application Priority Data
Nov. 23, 2014 (DE) .......................... 10 2014 117 115

(51) Int. Cl.
*F23D 3/40* (2006.01)
*B60H 1/22* (2006.01)
(Continued)

(52) U.S. Cl.
CPC ............. *F23D 3/40* (2013.01); *B60H 1/2206* (2013.01); *F23D 5/123* (2013.01); *F23D 5/126* (2013.01);
(Continued)

(58) Field of Classification Search
CPC .. F23D 3/40; F23D 5/123; F23D 2900/05002; F23D 2900/21002;
(Continued)

(56) References Cited

U.S. PATENT DOCUMENTS 3,592,577 A * 7/1971 Kofink ................... F23C 99/00
165/104.26
4,846,834 A * 7/1989 von Recum .......... A61F 2/0077
128/898
(Continued)

FOREIGN PATENT DOCUMENTS

DE 4141367 C1 11/1993
DE 102007012512 A1 9/2008
(Continued)

OTHER PUBLICATIONS

"DE4141367_C1_M—Machine Translation.pdf", machine translation, EPO.org, Sep. 17, 2018.*
(Continued)

*Primary Examiner* — Gregory L Huson
*Assistant Examiner* — Daniel E Namay
(74) *Attorney, Agent, or Firm* — Quarles & Brady LLP

(57) ABSTRACT

An evaporator arrangement (1) for evaporating liquid fuel for a mobile fuel-operated heating device, comprising: an evaporator unit (5) for distributing and evaporating liquid fuel; and at least one fuel supply line (6) for delivering liquid fuel to the evaporator unit (5). The evaporator unit (5) has at least one first section (B1) made of a metal wire mesh (8).

12 Claims, 3 Drawing Sheets a)

b)

(51) Int. Cl.
*F23R 3/30* (2006.01)
*F23R 3/40* (2006.01)
*F23D 5/12* (2006.01)
*F23D 5/18* (2006.01)

(52) U.S. Cl.
CPC ............... *F23R 3/30* (2013.01); *F23R 3/40* (2013.01); *B60H 2001/2271* (2013.01); *F23D 5/18* (2013.01); *F23D 2900/05002* (2013.01); *F23D 2900/21002* (2013.01)

(58) Field of Classification Search
CPC ......... F23D 5/18; F23D 5/126; B60H 1/2206; B60H 2001/2271; F23R 3/40; F23R 3/30
USPC ............................................................ 431/7
IPC .................... F23D 3/40, 5/18, 5/12; F23R 3/30, F23R 3/40; B60H 1/22
See application file for complete search history.

(56) References Cited

U.S. PATENT DOCUMENTS

| | | | | |
|---|---|---|---|---|
| 4,934,924 | A * | 6/1990 | Nakai | B60H 1/2209 237/12.3 C |
| 5,617,995 | A * | 4/1997 | Yasuda | B60H 1/2206 237/12.3 C |
| 6,027,334 | A * | 2/2000 | Blaschke | F01N 3/0256 126/116 R |
| 6,257,868 | B1 * | 7/2001 | Durst | F23C 99/006 431/11 |
| 6,991,454 | B2 * | 1/2006 | Gore | F23D 14/16 126/92 R |
| 7,157,066 | B2 * | 1/2007 | Diener | B82Y 30/00 423/445 B |
| 7,722,826 | B2 * | 5/2010 | Wiesenberg | F23G 7/06 422/129 |
| 9,857,081 | B2 * | 1/2018 | Collmer | B60H 1/2212 |
| 9,863,640 | B2 * | 1/2018 | Pfister | B60H 1/2203 |
| 9,897,311 | B2 * | 2/2018 | Collmer | B60H 1/2203 |
| 2001/0035463 | A1 * | 11/2001 | Takagi | F23D 3/40 237/12 |
| 2003/0027090 | A1 * | 2/2003 | Blaschke | B01B 1/005 431/243 |
| 2003/0196381 | A1 * | 10/2003 | Eberspach | B01B 1/005 48/197 FM |
| 2004/0146825 | A1 * | 7/2004 | Kramer | B60H 1/2203 431/208 |
| 2004/0170936 | A1 * | 9/2004 | Weclas | F23C 99/006 431/7 |
| 2004/0209214 | A1 * | 10/2004 | Wahl | F23D 3/40 431/261 |
| 2005/0136305 | A1 * | 6/2005 | Eberspach | F23D 3/40 429/435 |
| 2005/0173550 | A1 * | 8/2005 | Eberspach | B60H 1/2206 237/12 |
| 2007/0273052 | A1 * | 11/2007 | Schmidt | F23D 3/22 261/101 |
| 2008/0124666 | A1 * | 5/2008 | Stocker | F23C 99/006 431/7 |
| 2008/0134580 | A1 * | 6/2008 | Kah | B01B 1/005 48/197 FM |
| 2014/0193759 | A1 * | 7/2014 | Weber | F23C 7/06 431/314 |
| 2014/0234792 | A1 * | 8/2014 | Brehmer | F23D 3/40 431/329 |
| 2015/0102115 | A1 * | 4/2015 | Collmer | B60H 1/2212 237/12.3 C |
| 2015/0102116 | A1 * | 4/2015 | Pfister | B60H 1/2203 237/12.3 C |
| 2015/0102117 | A1 * | 4/2015 | Collmer | B60H 1/2203 237/12.3 C |

FOREIGN PATENT DOCUMENTS

| | | | |
|---|---|---|---|
| DE | 102008031083 A1 | 1/2010 | |
| DE | 102009003363 A1 | 7/2010 | |
| DE | 202010003300 U1 | 7/2010 | |
| DE | 102011013273 A1 | 9/2012 | |
| DE | 102011050368 A1 | 11/2012 | |
| DE | 102012111289 B3 | 3/2014 | |
| EP | 1662199 A2 | 5/2006 | |
| JP | 60026206 A * | 2/1985 | |
| JP | 07315038 A * | 12/1995 | ........... B60H 1/2206 |
| JP | 2003042409 A | 2/2003 | |
| RU | 81787 U1 | 3/2009 | |

OTHER PUBLICATIONS

"DE_102008031083_A1_M—Machine Translation.pdf", machine translation, EPO.org, Sep. 17, 2018.*
"DE_102012111289_B3_M—Machine Translation.pdf", machine translation, EPO.org, Sep. 17, 2018.*
"DE_202010003300_U1_H—Machine Translation.pdf", machine translation, EPO.org, Sep. 17, 2018.*
"RU_81787_U1—Machine Translation.pdf", machine translation, EPO.org, Sep. 17, 2018.*
International Search Report, with English translation, for PCT/DE2015/100449, and Written Opinion of the International Searching Authority, dated Mar. 2, 2016.

* cited by examiner a) b)

a)      b)      c)

EVAPORATOR ARRANGEMENT

CROSS-REFERENCE TO RELATED APPLICATIONS

This application represents the national stage entry of PCT International Application No. PCT/DE2015/100449 filed Oct. 26, 2015, which claims priority to German Patent Application Serial No. 10 2014 117 115.2 filed Nov. 23, 2014, the contents of which are hereby incorporated herein by reference for all purposes.

The present invention relates to an evaporator arrangement for evaporating liquid fuel for a mobile, fuel-operated heating device and a mobile heating device having such an evaporator arrangement.

In mobile heating devices which are operated with liquid fuel, there are often used so-called evaporator burners in which the liquid fuel, which may be formed in particular by means of petrol, diesel, ethanol or the like, evaporates in an evaporator body or is evaporated by the surface thereof, is mixed with supplied combustion air to form a fuel/air admixture and is subsequently converted with heat being released. The evaporator bodies which are used are formed by a porous, absorbent material and generally have a non-woven metal fabric or nonwoven metal fiber fabric.

A "mobile beating device" is intended in the present context to be understood to be a heating device which is configured for use in mobile applications and which is adapted accordingly. This means in particular that it is transportable (where applicable securely installed in a vehicle or only accommodated therein for transport) and is not configured exclusively for permanent stationary use, as is the case, for example, with heating a building. In this instance, the mobile heating device may also be securely installed in a vehicle (land-based vehicle, ship, etc.), in particular in a land-based vehicle. In particular, it may be configured for heating an inner vehicle space, such as, for example, a land-based, waterborne or airborne vehicle, and a partially open space, as may be found, for example, on ships, in particular yachts. The mobile heating device may also be used temporarily in a stationary manner, such as, for example, in large tents, containers (for example, construction cabins), etc. In particular, the mobile heating device, may be configured as an auxiliary heating unit or supplementary heating unit for a land-based vehicle, such as, for example, for a motor caravan, a mobile home, a bus, a passenger vehicle, etcetera.

The nonwoven metal fabrics which are generally used as evaporator bodies are subjected to relatively high production tolerances so that both the microstructure of the individual fibers and the orientation and distribution of the fibers in the evaporator body are subjected to relatively great fluctuations. These fluctuations have a great influence on the uniform distribution and direction dependency of the porosity, the permeability and the effective thermal conductivity of the evaporator body. These effects may result in a non-uniform fuel distribution and evaporation which, for example, may lead to the formation of deposits in the evaporator body and the build up of coke in the combustion chamber which is arranged downstream.

DE 10 2011 050 368 A1 describes an evaporator arrangement for an evaporator burner of a mobile heating device having an evaporator body for distributing and evaporating a liquid fuel. The evaporator body has at least one layer of a woven metal fabric comprising metal wires which are mutually interwoven. Although the use of woven metal fabric enables more precise production of the evaporator body, it is linked with a considerable increase of the production costs.

An object of the present invention is to provide an improved evaporator arrangement for evaporating liquid fuel for a mobile, fuel-operated heating device and an improved mobile heating device in which the problems which occur with conventional evaporator bodies are reduced and which enable cost-effective production.

The object is achieved with an evaporator arrangement for evaporating liquid fuel according to claim 1. Advantageous developments are set out in the dependent claims.

The evaporator arrangement for evaporating liquid fuel has an evaporator body for distributing and evaporating liquid fuel and at least one fuel supply line for supplying liquid fuel to the evaporator body. The evaporator body has at least a first region from a knitted metal wire fabric.

The evaporator arrangement is consequently constructed in such a manner that the liquid fuel is supplied to the evaporator body in the liquid phase and the evaporation/vaporization of the fuel is carried out in and on the evaporator body. A mixing of the evaporated fuel with combustion air to form a fuel/air admixture is consequently carried out only outside the evaporator body and where applicable air which is present at the beginning of the evaporation process is driven out of the evaporator body by the evaporating fuel so that no appreciable conversion of fuel with combustion air is carried out in the evaporator body.

As a result of the first region comprising knitted metal wire fabric, the properties of the evaporator body can be predetermined in a very precise manner. For example, the entire evaporator body may be formed from knitted metal wire fabric or, for example, only a region (or, where applicable, a plurality of regions) of the evaporator body may be formed from knitted metal wire fabric and other regions may be formed from different materials, in particular from non-woven metal fabric, woven metal fabric, braided metal fabric and/or knitted metal fabric. The evaporator body may in particular also have a plurality of regions which are formed from the same knitted metal wire fabric or from different knitted metal wire fabrics. Compared with an evaporator body, for example, of nonwoven metal fabric, the use of a knitted metal wire fabric has inter alia the advantage that the properties of the first region of knitted metal wire fabric can be predetermined in a very precise manner. The knitted metal wire fabric may in particular be produced in a very cost-effective manner from a metal wire or from a plurality of metal wires by means of a knitting process, wherein almost any shapes can be given to the knitted metal wire fabric, for example, on an industrial knitting machine and by means of the downstream processing operations. The knitted metal wire fabric for the first region may in this instance be prepared, for example, as a flat knitted fabric with a substantially planar shaping or also, for example, as a round knitted fabric with, for example, a substantially hose-like shape. The knitted metal wire fabric may, for example, also be provided with the desired properties, for example, by means of cutting to a desired length, turning over and, where applicable, sewing, rolling, folding, pressing or form pressing, milling, rolling, calibrating to dimension; sintering, soldering or welding the metal wire or the metal wires of the knitted metal wire fabric. Compared with, for example, a woven metal material, in which the individual wires extend in a plane, the knitted metal wire fabric can be produced in a significantly more cost-effective manner and where applicable brought into the desired shape without any waste. Should this nonetheless be desirable, the knitted metal wire fabric can also be additionally processed in a simple manner by means of punching, laser cutting or the like. Compared, for example, with a nonwoven metal fabric or a woven metal fabric, which have a substantially two-dimensional structure of individual layers, the use of the knitted metal wire fabric enables a cohesive three-dimensional structure of the evaporator body so that over the continuous wire or the continuous cohesive wires of the knitted metal wire fabric a good thermal conductivity is produced in all directions, that is to say, a high isotropy with respect to the thermal conduction can be provided. The use of the knitted metal wire fabric further also enables a high level of mechanical stability of the evaporator body since the tendency which a nonwoven metal fabric or a multi-layer woven metal fabric structure has for unraveling or separation of the individual layers is not present. Since a knitted metal wire fabric is involved, good thermal conduction is further provided, which is advantageous for maintaining a stable evaporation process.

The knitted metal wire fabric may in this instance in particular be formed from one or more wires of a temperature-resistant material, in particular a temperature-resistant steel. A knitted metal wire fabric is produced in a knitting process from a metal wire or where applicable a plurality of metal wires by the metal wire or the metal wires being wrapped around themselves as loops. Suitable industrial knitting machines are well-known. Knitted metal wire fabrics therefore have different structures and properties from nonwoven metal fabrics which have a large number of fibers which are arranged in a non-ordered manner, woven metal fabrics, metal braidings and metal meshes.

According to a development, the first region from knitted metal wire fabric has plastically deformed and compressed knitted metal wire fabric. As a result of the shaping and compression, the properties of the first region can be adjusted in a very selective manner. In particular, the porosity can be adjusted in a very selective manner. It is again possible for the first region to form the entire evaporation body or, however, other regions of the evaporator body may also be provided.

According to a development, the evaporator body has at least one additional region comprising knitted metal wire fabric having a porosity which is different from the first region. In this instance, different regions of the evaporator body may be provided selectively with different properties in order to provide the desired evaporation properties. The additional region may, for example, be formed from the same knitted metal wire fabric as the first region and only be compressed to a greater or lesser extent in order to obtain the other porosity. In this instance, the additional region may optionally also be formed in an integral manner with the first region from a cohesive knitted metal wire fabric which is merely formed or compressed to different extents. On the other hand, the additional region may also be formed from a different knitted metal wire fabric which differs, for example, in terms of the thickness of the metal wire used or the metal wires used.

According to a development, the knitted metal wire fabric has in the at least one additional region a degree of compression which is different from the knitted metal wire fabric in the first region and/or a different wire thickness.

Depending on the desired properties of the evaporator body, the knitted metal wire fabric may be formed from a flat knitted fabric and/or a round knitted fabric. The two configurations may, for example, also be combined in such a manner that one region is formed from a flat knitted fabric and another region is formed from a round knitted fabric.

According to a development, the wires of the knitted metal wire fabric are at least partially welded, soldered or sintered to each other. In this instance, the mechanical stability of the evaporator body can be further increased and also the thermal conductivity can additionally be improved. In addition to the welding, soldering, or sintering of the wires of the knitted metal wire fabric to each other, it is, for example, also possible to carry out a welding, soldering or sintering to other regions of the evaporator body and/or other components of the evaporator arrangement, in particular, for example, to an evaporator accommodation or an evaporator holder.

According to a development, the evaporator body has at least a second region comprising a nonwoven metal fabric, a woven metal fabric, a metal braiding and/or a meshed metal fabric. In this instance, the advantages and disadvantages of the different materials or structures can be selectively combined to achieve the desired distribution and evaporation properties.

According to a development, the second region is connected to the first region by means of sintering, soldering, or welding. In this instance, a particularly high level of mechanical stability of the evaporator body is achieved and the thermal transmission between the regions is improved.

According to a development, the wires of the knitted metal wire fabric have a round or flattened cross-sectional shape. In this instance, particularly cost-effective production from a round wire is enabled. If the properties of the evaporator body which are intended to be achieved require it, however, it is also possible to use other cross-sectional shapes, for example, flat wire or metal wire with a polygonal cross-sectional shape can also be used. It is, for example, also possible to construct a region of the evaporator body from a knitted metal wire fabric with round wires and a region of the evaporator body from a knitted metal wire fabric with differently shaped wires. Regardless of the cross-sectional shape, the surface of the wires can also be selectively roughened.

According to a development, the evaporator arrangement has a cup-shaped evaporator accommodation in which the evaporator body is received and in which the fuel supply line opens. In this instance, a reliable evaporation of the liquid fuel is achieved in a structurally particularly simple and cost-effective manner.

According to another development, the evaporator arrangement has a rod-like evaporator holder against the outer periphery of which the evaporator body rests. In this instance, it is possible to achieve a particularly, good preparation of a fuel/air admixture after the evaporation of the liquid fuel in and on the evaporator body and a good stabilization of the conversion process of the fuel/air admixture. The rod-like evaporator holder may in this instance, for example, be constructed as a solid rod, whose outer periphery is at least partially covered by the evaporator body or may, for example, also instead be provided in a tube-like manner with a hollow inner space, for example, in order to enable a return of combustion gases through the hollow space.

According to a development, a combustion air supply is provided for supplying combustion air to a side of the evaporator body facing away from the fuel supply line. In this instance, the fuel which is evaporated in and on the evaporator body can be reliably discharged from the evaporator body and prepared with the supplied combustion air to form a desired fuel/air admixture. Since the combustion air is supplied to a side of the evaporator body facing away from the fuel supply line, in this instance the actual evaporation process or vaporization process of the liquid fuel on and in the evaporator body is not impeded.

The knitted metal wire fabric may, for example, also be provided with a catalytic coating in order to reduce or prevent the formation of deposits.

The object is also achieved with a mobile heating device having such an evaporator arrangement according to claim 13.

Other advantages and developments will be appreciated from the following description of embodiments with reference to the appended drawings, in which:

FIG. 1 is a schematic illustration of an evaporator arrangement for evaporating liquid fuel in a mobile, fuel-operated heating device according to an embodiment;

FIG. 2 a) is a schematic illustration of an evaporator accommodation having an evaporator body according to a first modification of the embodiment;

FIG. 2 b) is a schematic illustration of an evaporator accommodation having an evaporator body according to a second modification of the embodiment;

FIG. 3 a) is a schematic illustration of an evaporator accommodation having an evaporator body according to a third modification of the embodiment;

FIG. 3 b) is a schematic illustration of an evaporator accommodation having an evaporator body according to a fourth modification of the embodiment;

FIG. 3 c) is a schematic illustration of an evaporator accommodation having an evaporator body according to a fifth modification of the embodiment;

FIG. 4 a) is a schematic illustration of a modification of the embodiment, in which the evaporator body is arranged on the outer periphery of a rod-like evaporator holder instead of in an evaporator accommodation;

FIG. 4 b) is a schematic illustration of another embodiment based on the modification of FIG. 4 a);

EMBODIMENT

A first embodiment is described in greater detail below with reference to FIG. 1.

Figure 1:
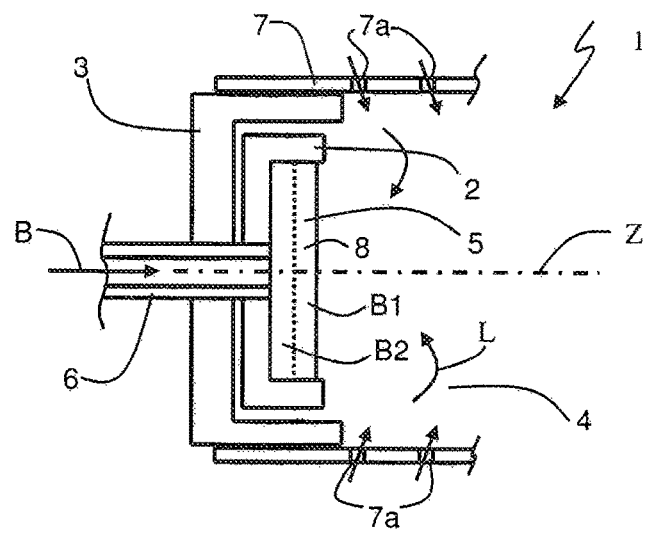

FIG. 1 schematically illustrates a region of an evaporator accommodation 2 and a burner lid 3 of an evaporator burner for a mobile heating device. FIG. 1 is, a schematic illustration in a plane which contains a main axis Z of the evaporator burner. The evaporator burner may, for example, substantially have a rotational symmetry with respect to the main axis Z. The evaporator burner may, for example, be constructed for a vehicle heating device, in particular a supplementary heating unit or an auxiliary heating unit. The evaporator burner is in this instance stance in particular constructed to convert in a combustion space 4 an admixture of evaporated fuel and combustion air, that is to say, a fuel/air admixture, with heat being released. In this case, the conversion may in particular be carried out in a flaming combustion, but a partially or completely catalytic conversion is also possible. The heat released is transferred in a heat exchanger (not illustrated) to a medium which is intended to be heated and which may be formed, for example, by air or a cooling fluid. In the schematic illustration of FIG. 1, in particular the heat exchanger, the discharge line for the hot combustion exhaust gases, the combustion air conveying device which is also provided (for example, a fan), the fuel conveying device (for example, a metering pump), the control unit for controlling the evaporator burner, etc., are not illustrated. These components are well-known and described extensively in the prior art.

The evaporator arrangement 1 has an evaporator accommodation 2 in which an absorbent evaporator body 5 is arranged. The evaporator accommodation 2 has in the embodiment a substantially cup-like shape. The evaporator body 5 is received in the cup-shaped recess of the evaporator accommodation 2 and may in particular be securely retained therein, for example, by means of welding, soldering, clamping or using a suitable securing element. The construction of the evaporator body 5 is described in even greater detail below.

A fuel supply line 6 for supplying liquid fuel to the evaporator body 5 is provided. The fuel supply line 6 opens in the evaporator accommodation 2 and is connected to a fuel conveying device (not illustrated) by means of which liquid fuel can be conveyed through the fuel supply line 6 to a predetermined extent, as schematically illustrated by an arrow B. The fuel supply line 6 is securely connected, for example, by means of welding or soldering, to the evaporator accommodation 2.

The combustion space 4 is delimited at the peripheral side by a combustion chamber 7 which may be formed, for example, by a substantially cylindrical component of a temperature-resistant steel. The combustion chamber 7 is provided with a plurality of holes 7a via which combustion air can be supplied to the combustion space 4 as illustrated schematically in FIG. 1 by means of arrows. The holes 7a are in this instance part of a combustion air supply L, via which combustion air is supplied to a side of the evaporator body 5 facing away from the fuel supply line 6.

The evaporator arrangement 1 is constructed in such a manner that during operation liquid fuel can be supplied via the fuel supply line 6 to the evaporator body 5. In and on the evaporator body 5, on the one hand, via a large number of hollow spaces, a distribution of the fuel is carried out over the entire width of the evaporator body 5 and, on the other hand, at the side facing the combustion space 4, an evaporation or vaporization of the fuel is carried out. In the embodiment illustrated, the evaporator body 5 has a substantially circular cross-sectional shape, at the center of which the main axis Z of the evaporator burner extends. The evaporator body 5 may, however, also have other cross-sectional shapes.

The evaporator arrangement 1 is constructed in such a manner that an evaporation or vaporization of the liquid fuel is carried out in the evaporator body 5 and the evaporated fuel is mixed with the supplied combustion air to form a fuel/air admixture only during discharge from the evaporator body 5, that is to say, at the combustion space side. The supply of liquid fuel and combustion air is consequently carried out at different sides of the evaporator body 5. The conversion of the fuel/air admixture in an exothermic reaction is carried out in this instance not in the evaporator body, but instead in the combustion space 4 which is arranged downstream thereof. There are consequently during operation liquid fuel and fuel vapor in the evaporator body 5 and, as a result of the evaporation or evaporation process, where applicable, air which is initially present is driven out of the evaporator body 5.

In the embodiment illustrated in FIG. 1, the evaporator body 5 has a structure with a plurality of functional regions which in the specifically illustrated example is sub-divided into a first region B1 and a second region B2 with a structure which differs from the structure in the first region B1. In the embodiment, the second region B2 is arranged facing the fuel supply line 6 and the first region B1 is arranged facing the combustion space 4.

Figure 5:
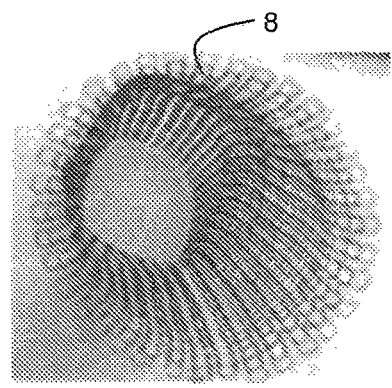
FIG. 5 is an illustration of a knitted metal wire fabric in the form of a round knitted fabric, as may be used in the evaporator body.
Figure 6:
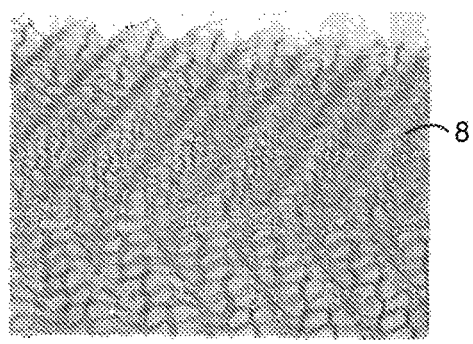
FIG. 6 is an illustration of a knitted metal wire fabric in the form of a flat knitted fabric, as may be used in the evaporator body.

In the embodiment, at least the first region B1 of the evaporator body 5 is formed from a knitted metal wire fabric 8. The knitted metal wire fabric 8 is in this instance in particular provided with the desired shape and porosity by means of plastically deforming and compression. For the first region B1 of knitted metal wire fabric 8 it is possible to use in this instance as a starting material in particular, for example, a round knitted fabric illustrated in FIG. 5 or a flat knitted fabric illustrated in FIG. 6. According to a preferred embodiment, the wires of the knitted metal wire fabric 8 can be welded, soldered or sintered to each other. The wires of the knitted metal wire fabric 8 may in particular have a round cross-sectional shape, but other shapes, such as, in particular flat wire or a polygonal cross-sectional shape are also possible.

In the embodiment illustrated, the second region B2 of the evaporator body 5 is also formed from a knitted metal wire fabric 8, but the evaporator body 5 has in the second region B2 a porosity which is different from the first region B1. In this instance, the second region B2 may, for example, involve the same knitted metal wire fabric 8 which has merely been compressed to a differing degree, or, for example, there may also be used a different knitted metal wire fabric which differs from the knitted metal wire fabric 8 of the first region B1, for example, in terms of the wire thickness, mesh width, wire shape or the like. As a result of the different porosity, the second region B2 may, for example, be optimized for a distribution of the liquid fuel and the first region B1, for example, for the best possible evaporation of the fuel.

In an alternative embodiment of the evaporator body 5, only the first region B1 is formed from knitted metal wire fabric 8 and the second region B2 may in particular have a woven metal fabric, a nonwoven metal fabric, a metal braiding and/or a meshed metal fabric. In this instance, the second region 132 may also be connected to the first region B1, for example, by means of soldering, welding or sintering.

Although a specific embodiment is illustrated in FIG. 1, in which the first region B1 comprising knitted metal wire fabric 8 is arranged at a side of the evaporator body 5 facing the combustion space 4 and the second region B2 is arranged at a side of the evaporator body 5 facing the fuel supply line 6, other arrangements are, also possible. For example, the first region B1 may also be arranged at the side facing the fuel supply line 6 or the different regions may also be arranged laterally beside each other. For example, it is also possible to provide an outer edge region of the evaporator body 5 with a structure or porosity which is different from a central region of the evaporator body 5. Although only two different regions B1 and B2 have been described with reference to FIG. 1, more than two different regions may also be provided and almost freely arranged with respect to each other in order to achieve the desired properties of the evaporator body 5.

Although there has been described with reference to the embodiment an evaporator body 5 which has at least two different regions B1 and B2, according to a modification illustrated in FIG. 2a) it is, for example, also possible to construct the evaporator body 5 with only the first region B1, that is to say, not to provide any different regions.

Figure 2:
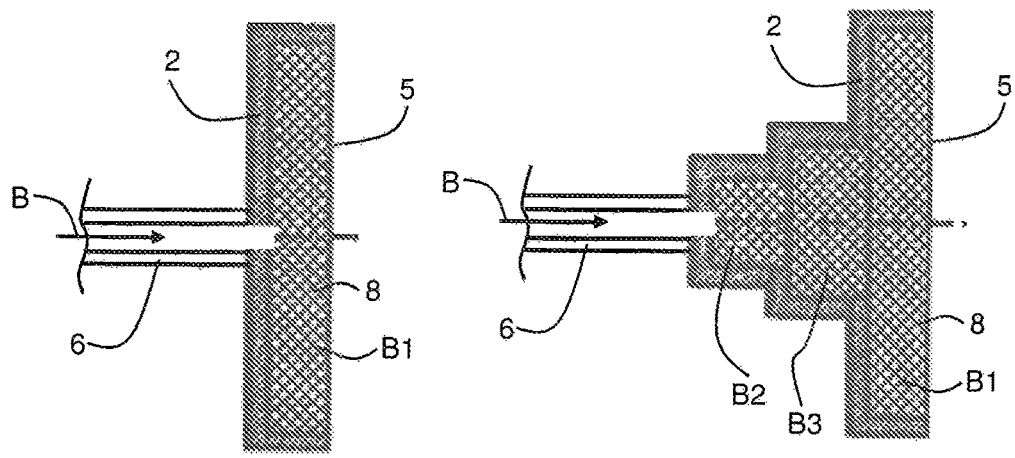

In the modification which is schematically illustrated in FIG. 2b), the evaporator body 5 has a stepped construction with a total of three regions B1, B2, B3 and the evaporator accommodation 2 is constructed accordingly. Also in this instance, for example, the regions B1, B2 and B3 of the evaporator body 5 may each be formed by a knitted metal wire fabric 8, which may optionally be provided with a different porosity in the different regions, or, for example, one or two regions may have nonwoven metal fabric, woven metal fabric, metal braiding and/or meshed metal fabric.

Figure 3:
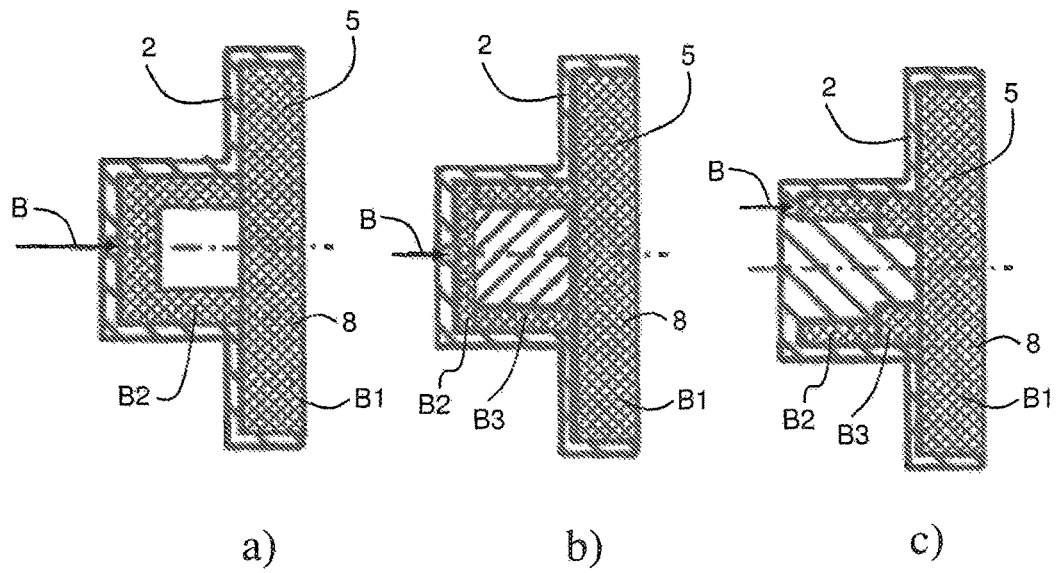

Other possible embodiments of evaporator bodies 5 having a plurality of regions B1, B2, B3 are illustrated schematically in FIGS. 3a, 3b and 3c. Although in FIGS. 3a, 3b and 3e, the fuel line 6 and other components are not illustrated again, it is self-evident that these additional components are also present in the modification. In these instances, the different regions may also again be formed in particular by knitted metal wire fabric 8 or a portion of the regions may, for example, again have nonwoven metal fabric, woven metal fabric, metal braiding and/or meshed metal fabric.

Figure 7:
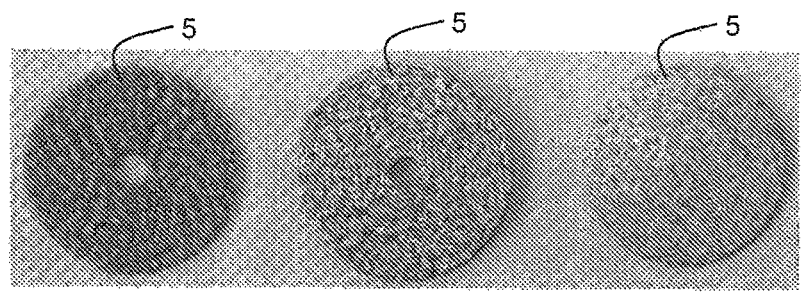
FIG. 7 a) to c) are illustrations of different evaporator bodies which have been produced from knitted metal wire fabric by means of plastically deforming and compressing.

FIGS. 7 a) to c) illustrate different possible embodiments of evaporator bodies 5 of plastically deformed and compressed knitted metal wire fabric 8.

Figure 4:
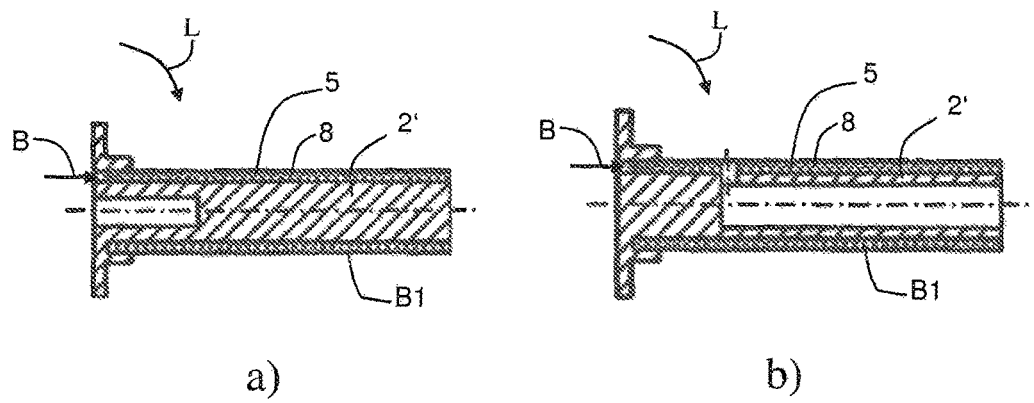

FIG. 4a) and FIG. 4b) illustrate two further modifications in which the evaporator body 5 is not received, as in the above-described embodiment and the previously described modifications, in a cup-shaped evaporator accommodation 2, but instead the evaporator body 5 is arranged on the outer periphery of a rod-like evaporator holder 2'. In the modification schematically illustrated in FIG. 4a), the evaporator holder 2' is constructed in this instance as a solid rod, whereas the evaporator holder 2' in the modification illustrated in FIG. 4b) is constructed with an inner hollow space which, for example, may be used to return combustion gases through the evaporator holder 2'. In FIG. 4a) and FIG. 4b), the fuel supply line 6 and the additional components are also not illustrated again for reasons of simplification. The position of the fuel line 6 can, however, for example, be identified by the position of the fuel supply indicated by the arrow B. It can be seen that in the modifications which are schematically illustrated in FIGS. 4a) and 4b), the fuel supply line L is also provided at a side of the evaporator body 5 facing away from the fuel line 6.

Although FIG. 4a) and FIG. 4b) illustrate an evaporator body 5 which has only one region B1 of knitted metal wire fabric 8, in these modifications it is also possible for the evaporator body 5 to have two or more different regions. The different regions may in this instance again have, for example, a different porosity. The different regions may, for example, also all be formed from knitted metal wire fabric 8 or, however, there may also be provided in addition one or more regions which have nonwoven metal fabric, woven metal fabric, metal braiding and/or meshed metal fabric.

In all the described possibilities of the embodiment, it is in particular possible to connect the different regions B1, B2, B3 to each other, for example, by means of welding, soldering or sintering or, however, also to connect the evaporator body 5 to the evaporator accommodation 2 or the evaporator holder 2', for example, by means of welding, soldering or sintering.

During the processing of the knitted metal wire fabric 8 for the evaporator body 5, it is, for example, possible to use regions with smaller density (for example, less densely laid or compressed knitted metal wire fabric) in a selective manner for tolerance compensation by the regions having a higher level of deformability than other regions. Furthermore, in a similar manner it is also possible to selectively form protuberances of the knitted metal wire fabric 8 in order to enable a tolerance compensation in these regions.

Furthermore, it is also possible to introduce in the knitted metal wire fabric 8 of the evaporator body 5, for example, local compressions selectively in regions in order to achieve the desired properties. Such local compressions can, for example, be introduced by means of subsequent rolling.

In order to adjust the desired properties of the evaporator body, the wire surface of the metal wire of the knitted metal wire fabric may, for example, also be selectively roughened. This may, for example, be carried out by means of knurling the wire used for the knitted metal wire fabric 8.

It is further possible, as a result of the type of compression of the knitted metal wire fabric, to selectively adjust an anisotropy of the thermal conduction, for example, in order to achieve improved thermal conduction in a specific direction.

The invention claimed is:

1. An evaporator arrangement for evaporating liquid fuel for a mobile, fuel-operated heating device, having:
    an evaporator body for distributing and evaporating liquid fuel and at least one fuel supply line for supplying liquid fuel to the evaporator body, wherein the evaporator body has at least a first region from a knitted metal wire fabric, and wherein the knitted metal wire fabric in the first region comprises a plastically deformed and compressed knitted metal wire fabric.

2. The evaporator arrangement as claimed in claim 1, wherein the evaporator body has at least one additional region comprising knitted metal wire fabric having a porosity which is different from the first region.

3. The evaporator arrangement as claimed in claim 2, wherein the knitted metal wire fabric has in the at least one additional region a degree of compression which is different from the knitted metal wire fabric in the first region and/or a different wire thickness.

4. The evaporator arrangement as claimed in claim 1, wherein the knitted metal wire fabric is formed from a flat knitted fabric and/or a round knitted fabric.

5. The evaporator arrangement as claimed in claim 1, wherein the wires of the knitted metal wire fabric are at least partially welded, soldered or sintered to each other.

6. The evaporator arrangement as claimed in claim 1, wherein the evaporator body has at least a second region comprising a nonwoven metal fabric, a woven metal fabric, a metal braiding and/or a meshed metal fabric.

7. The evaporator arrangement as claimed in claim 6, wherein the second region is connected to the first region by means of sintering, soldering or welding.

8. The evaporator arrangement as claimed in claim 1, wherein the wires of the knitted metal wire fabric have a round or a flattened cross-sectional shape.

9. The evaporator arrangement as claimed in s claim 1, wherein the evaporator arrangement has a cup-shaped evaporator accommodation in which the evaporator body is received and in which the fuel supply line opens.

10. The evaporator arrangement as claimed in one of claim 1, wherein the evaporator arrangement has a rod-like evaporator holder against the outer periphery of which the evaporator body rests.

11. The evaporator arrangement as claimed in claim 1, wherein a combustion air supply is provided for supplying combustion air to a side of the evaporator body facing away from the fuel supply line.

12. Mobile heating device having an evaporator arrangement as claimed in claim 1.

* * * * *

UNITED STATES PATENT AND TRADEMARK OFFICE
CERTIFICATE OF CORRECTION

PATENT NO. : 10,408,447 B2
APPLICATION NO. : 15/527423
DATED : September 10, 2019
INVENTOR(S) : Klaus Moesl et al.

It is certified that error appears in the above-identified patent and that said Letters Patent is hereby corrected as shown below:

In the Specification

Column 5, Line 59, "this instance stance in" should be --this instance in--.

Column 7, Line 44, "region 132 may" should be --region B2 may--.

Column 8, Line 16, "and 3e" should be --and 3c--.

Signed and Sealed this
Fifth Day of November, 2019

Andrei Iancu
*Director of the United States Patent and Trademark Office*